Oct. 7, 1930.  E. I. SPONABLE  1,777,682
COMBINED MOTION PICTURE AND SOUND CAMERA
Filed Nov. 12, 1927  2 Sheets-Sheet 2
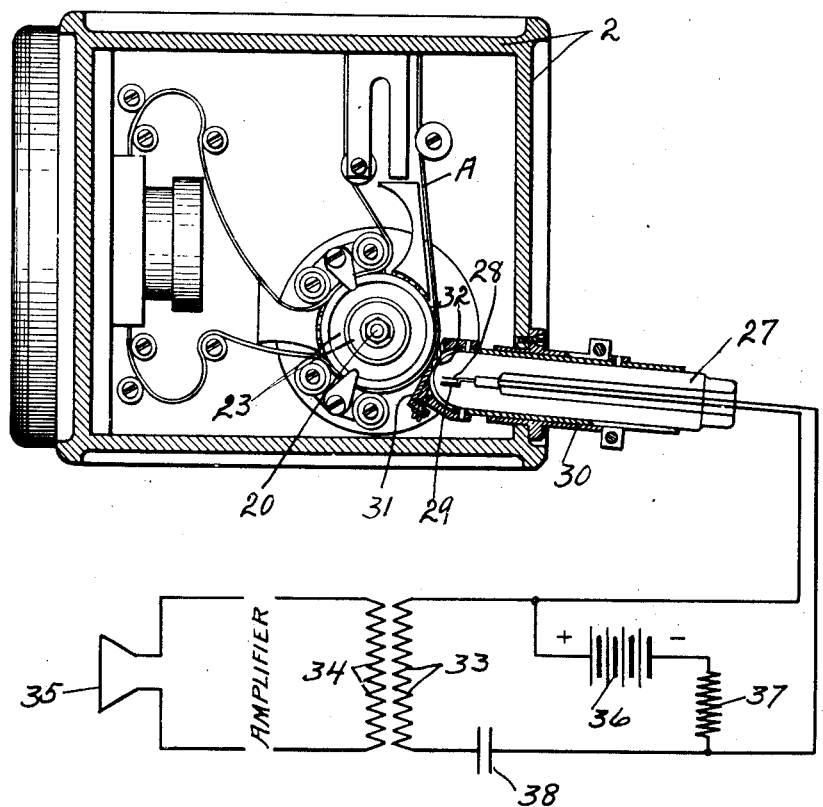

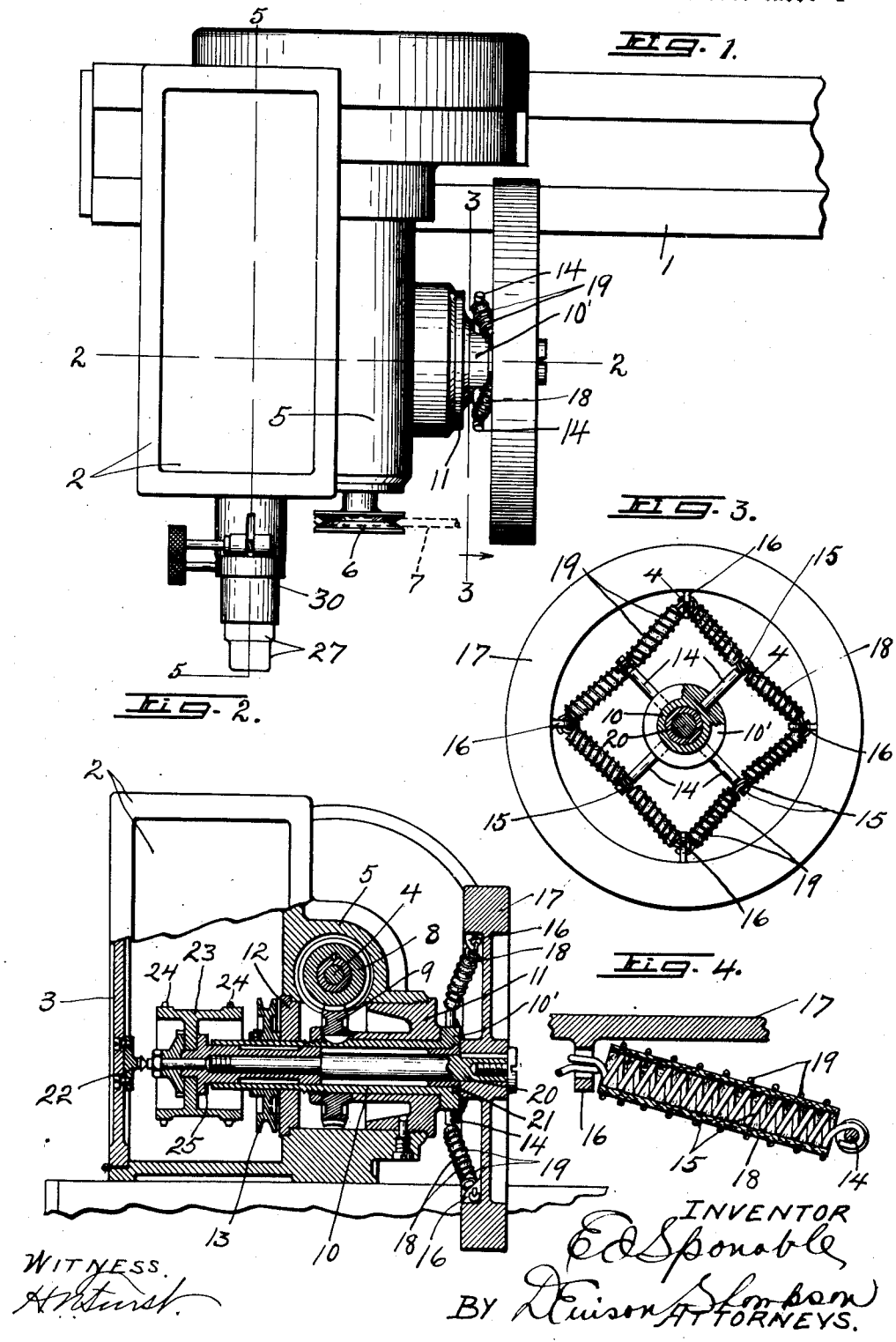

Patented Oct. 7, 1930

1,777,682

UNITED STATES PATENT OFFICE

EARL I. SPONABLE, OF NEW YORK, N. Y., ASSIGNOR TO FOX CASE CORPORATION, OF NEW YORK, N. Y., A CORPORATION OF NEW YORK

COMBINED MOTION-PICTURE AND SOUND CAMERA

Application filed November 12, 1927. Serial No. 232,818.

This invention relates to certain new and useful improvements in combined moving picture and sound cameras.

It is found that in the ordinary camera in which the shutter shaft is directly driven from any suitable source of power and the feed and take-up sprocket shaft is driven by gearing from the shutter-shaft, that any irregularities in the movement of the shutter-shaft, is transmitted to the sprocket shaft and injuriously affects the production of an accurate and perfect sound record upon a sensitized surface while moving around the feed and take-up sprocket.

The main object of this invention is to provide a yielding driving connection between the shutter-shaft and the sprocket-shaft of an ordinary moving picture camera to act as a damped filter, or ironing-out system of any mechanical pulses which would otherwise be transmitted to the sprocket-shaft due to any irregularity in the movement of the driving mechanism, thereby producing a uniform velocity of said sprocket-shaft together with the feed and take-up sprocket mounted thereon.

This smooth, steady and uniform rotary movement of the sprocket is particularly desirable and necessary when a sound picture, i. e. a picture of light wave variations as produced by electrical variations conforming to sound wave variations is being taken while the moving picture film or sensitized surface is moved around and in contact with the feed and take-up sprocket.

Other objects and advantages relating to the details of the structure and the form and relation of the parts thereof will more fully appear from the following description, taken in connection with the accompanying drawing, in which:—

Figure 1 is a top plan view of a motion picture camera.

Figure 2 is a section on the plane of line 2—2, Figure 1.

Figure 3 is a section on line 3—3, Figure 1.

Figure 4 is a section on line 4—4, Figure 3.

Figure 5 is a section on line 5—5, Figure 1, illustrating the position at which the sound record is produced.

The apparatus consists of a base —1— upon which the camera case —2— is mounted. The camera case —2— is of a rectangular box-shape having a door —3— hinged to its front side, while a shutter-shaft —4— is journaled in a cylindrical case —5— cast or otherwise secured to the rear side of the camera-case —2—.

The shutter shaft —4— may be driven in the usual manner, as by a motor (not shown) connected to the grooved pulley —6— mounted on the outer rear end of the sprocket-shaft —4— by a belt —7—.

Keyed or otherwise secured to the shutter-shaft —4— and positioned a short distance ahead of the rear end thereof is a worm —8— which meshes with and drives a worm-gear —9— keyed or otherwise secured to a tubular shaft —10— mounted in bearings —11— and —12— carried by the rear side walls of the camera case —2—.

A take-up pulley —13— is secured to the tubular shaft —10— near its inner end and positioned just inside the bearing —12— and rotates with the tubular shaft, while the other end of the tubular shaft extends through the bearing 11 and has an annular flange 10' or enlarged portion which engages the outer face of said bearing and limits the inner movement of the tubular shaft 10.

Secured to the flange 10' at right angles to each other are in this instance four radial arms or posts 14 having an annular groove near their outer end in which are clamped (or otherwise secured) one end of two drive-coiled springs 15, said drive springs extending in opposite directions and having their other ends secured to lugs 16 secured to and spaced 90 degrees from each other upon the adjacent inner face of the fly-wheel —17— of required weight.

The radial arms 14 are, in this instance of sufficient length as to have their annular grooves substantially in the plane of a line drawn between the two adjacent lugs, and as the drive springs are of equal tension, the radial arms are normally held in a position midway between their respective lugs. About the periphery of the drive springs 15 is wrapped in this instance a layer of felt —18— altho some other suitable material or fabric may be used, and held in place by a comparatively weak spring 19 coiled about the felt and tensioned to hold the felt or fabric firmly against the drive springs, but not otherwise secured thereto.

The layer of felt together with the retaining springs have a damping effect upon the action of the drive springs, as motion is being transmitted by said drive springs from the tubular shaft to the fly-wheel and the mechanism connected therewith.

The fly-wheel —17— is keyed or otherwise secured to the outer end of the sprocket shaft —20—, which is journaled in a suitable bearing —21— mounted in the inner wall of the outer end of the tubular shaft —10—. The opposite or front end of the shaft —20— is preferably formed with a conical recess for receiving the conical end of a journal —22— secured to and projecting inwardly from the door —3—, said journal engaging in the conical recess in the shaft —20— when the door is closed to assist in supporting said shaft and maintaining a smooth and uniform movement of the shaft together with the feed and take-up sprocket —23— which is mounted upon said shaft and rotates therewith.

The sprocket —23— is positioned within the case —2— in the usual manner, and may, as shown, consist of a cylinder formed with spaced rows of teeth —24— upon the periphery thereof for engaging the usual openings in a moving picture film. This cylinder may be mounted in any suitable manner, as upon a sleeve —25— mounted in the inner end of the tubular shaft —10—, such sleeve being secured to the shaft —20— for simultaneous rotation therewith.

It is now evident that any mechanical pulses or lack of steadiness or uniformity transmitted to the tubular shaft 10 which may be caused by any irregularity of movement of the shutter shaft due, for instance, to any variation in the speed of the driving motor, or to varying air pockets adjacent the shutter shaft, or to any mechanical pulses developed in the driving gears, will be absorbed or filtered by the yielding drive springs in transmitting the motion from the tubular shaft to the steadying flywheel and the shaft and sprocket driven thereby, thus producing a regular, steady and uniform movement to the film as it is moved around the feed and take up sprocket at which time and position the sound picture is being taken, as more clearly seen in Figure 5.

A source of light, as a lamp —27— including two spaced electrodes —28— and —29— is enclosed in an adjustable casing —30— penetrating the rear end wall of the casing —2— of the camera and provided at its front end with a plate 31 disposed tangential to the feed and take-up sprocket —23— and having a narrow elongated slit —32— through which light from the lamp —27— can pass to the film A. The lamp or source of light —27— is modulated in accordance with sound waves so that the record produced on the film while moving around the feed and take-up sprocket —23— will conform to sound waves in any suitable manner, as by connecting the electrodes 28 and 29 in circuit with the primary —33— of a transformer, the secondary 34 of which through any number of stages of amplification is connected in circuit with a microphone 35. The source of light is maintained constantly lit, as by means of a battery —36— connected across the primary 33 of the transformer, and a resistance 37 may be provided, if desired.

In order to prevent the lighting current from flowing through the primary 33 of the transformer, a condenser 38 may be provided.

As before stated, it is essential that the film shall move in a regular and uniform manner while the sound record is being produced if an accurate, sharply defined record is to be produced, and it is this fact that necessitates the driving of the feed and take-up sprocket in a steady and uniform manner in order that the film may be carried past the slit —32— regularly, steadily and uniformly, and this is accomplished by the yielding driving connection between the tubular drive-shaft and fly-wheel in the manner hereinbefore described.

Although I have shown and particularly described the preferred embodiment of my invention, I do not wish to limit myself to the exact details of construction shown, as various changes may readily be made without departing from the spirit of this invention, as set forth in the appended claims.

I claim:

1. In a combined moving picture and sound camera, a sprocket about which a film moves during the taking of moving pictures, means for exposing the film to sound modulated light waves during its movement around said sprocket, a sprocket-shaft connected to the sprocket, a tubular shaft, a shutter-shaft, means for driving said shutter shaft, a worm and a worm-gear, one of the same mounted on the shutter shaft and the other connected to the tubular shaft for driving said tubular shaft, and a yielding driving connection between the tubular shaft and the sprocket shaft.

2. In a combined moving picture and sound camera, a sprocket about which a film moves during the taking of moving pictures, means for exposing the film to sound modulated light waves during its movement around said sprocket, a sprocket-shaft for driving said sprocket, a tubular shaft, a shutter shaft, and means for driving the tubular shaft from the shutter shaft, a yielding driving connection between said tubular shaft and sprocket shaft, and means to produce a damped effect upon said yielding driving connection.

3. In a combined moving picture and sound camera, a sprocket about which a film moves during the taking of moving pictures, means for exposing the film to sound modulated light waves during its movement around said sprocket, a sprocket shaft for driving said sprocket, a tubular shaft, a shutter shaft and means for driving the tubular shaft from the shutter shaft, a balance wheel on the sprocket shaft, a flange having radial arms on the tubular shaft, opposed coil springs connected between said radial arms and the balance wheel, a pliable fibrous material about said springs, and a weak spring coiled about said fibrous material for holding the same firmly against the coil springs.

In witness whereof I have hereunto set my hand this 4th day of October, 1927.

EARL I. SPONABLE.